United States Patent
O'Connor et al.

(10) Patent No.: US 8,788,154 B2
(45) Date of Patent: Jul. 22, 2014

(54) CONSTRUCTION MACHINE CONTROL METHOD AND CONSTRUCTION MACHINE CONTROL SYSTEM

(75) Inventors: Raymond M. O'Connor, Livermore, CA (US); Kaoru Kumagai, Itabashi-ku (JP); Jun-ichi Kodaira, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 150 days.

(21) Appl. No.: 13/610,945

(22) Filed: Sep. 12, 2012

(65) Prior Publication Data

US 2014/0074361 A1    Mar. 13, 2014

(51) Int. Cl.
*G06G 7/76*    (2006.01)
*G06G 7/00*    (2006.01)
*G06F 19/00*   (2011.01)
*G06F 17/00*   (2006.01)

(52) U.S. Cl.
USPC .......... 701/50; 356/3.09; 356/491; 356/141.4

(58) Field of Classification Search
USPC ........... 701/50, 93, 25, 70, 301, 19, 13, 36, 1, 701/26; 172/4.5; 356/4.08, 139, 141.4, 356/3.03, 3, 4.01
See application file for complete search history.

(56) References Cited

U.S. PATENT DOCUMENTS

| | | | | |
|---|---|---|---|---|
| 5,729,453 | A * | 3/1998 | Lee et al. | 701/50 |
| 5,767,960 | A * | 6/1998 | Orman | 356/139.03 |
| 5,774,207 | A * | 6/1998 | Yoshida et al. | 356/3.07 |
| 6,286,607 | B1 * | 9/2001 | Ohtomo et al. | 172/4.5 |
| 6,947,820 | B2 * | 9/2005 | Ohtomo et al. | 701/50 |
| 7,022,962 | B2 * | 4/2006 | Ohtomo et al. | 250/206.1 |
| 7,081,606 | B2 * | 7/2006 | Osaragi et al. | 250/206.1 |
| 7,110,102 | B2 * | 9/2006 | Ohtomo et al. | 356/141.4 |
| 8,068,962 | B2 * | 11/2011 | Colvard | 701/50 |
| 2004/0125365 | A1 | 7/2004 | Ohtomo et al. | |
| 2005/0216167 | A1 * | 9/2005 | Nozawa et al. | 701/93 |
| 2006/0198700 | A1 | 9/2006 | Maier et al. | |
| 2010/0299014 | A1 * | 11/2010 | Bouvier | 701/25 |
| 2014/0074295 | A1 | 3/2014 | Kumagai et al. | |

FOREIGN PATENT DOCUMENTS

| | | |
|---|---|---|
| JP | 2004-212058 A | 7/2004 |
| JP | 2008-531888 A | 8/2008 |
| JP | 4416925 B2 | 2/2010 |
| WO | 2006/092441 A1 | 9/2006 |

\* cited by examiner

*Primary Examiner* — Thomas Black
*Assistant Examiner* — Robert Payne
(74) *Attorney, Agent, or Firm* — Nields, Lemack & Frame, LLC

(57) ABSTRACT

A construction machine control system comprises a laser surveying instrument for projecting N-shaped beams in rotary irradiation, a construction machine operated within a predetermined range of the N-shaped beams, and an elevation angle detecting unit. The construction machine comprises a working mechanical unit for carrying out construction operation, a machine control device for controlling the working mechanical unit, and at least three beam detectors disposed at known positions with respect to reference position of the construction machine. The beam detectors detect the three fan beams and output result of photodetection. The elevation angle detecting unit obtains elevation angles of each of the beam detectors with respect to the laser surveying instrument based on result of photodetection of three fan beams from the beam detectors. The machine control device is configured to control tilting of the working mechanical unit based on the elevation angle obtained.

10 Claims, 11 Drawing Sheets

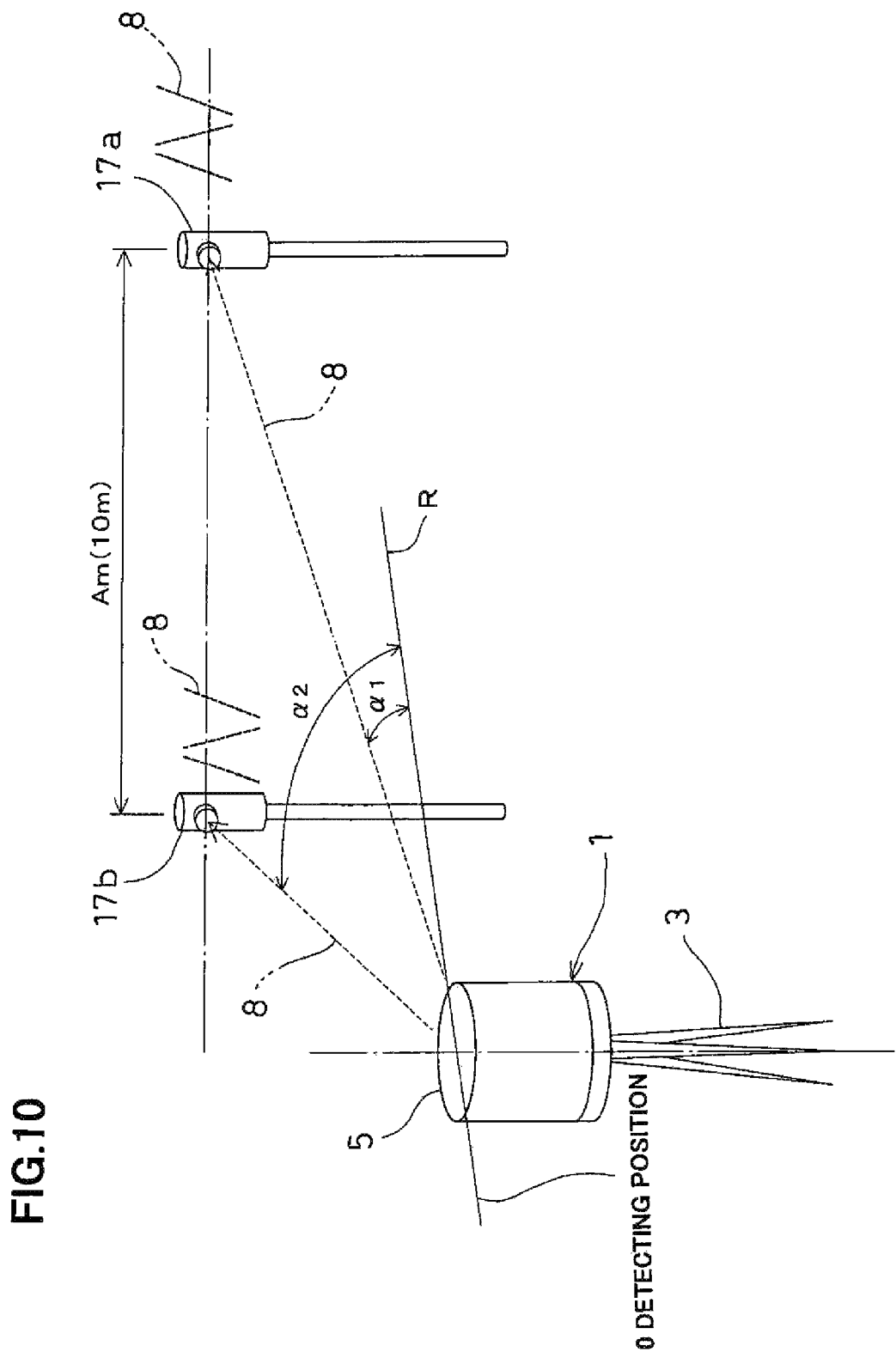

CONSTRUCTION MACHINE CONTROL METHOD AND CONSTRUCTION MACHINE CONTROL SYSTEM

BACKGROUND OF THE INVENTION

The present invention relates to a construction machine control method and a construction machine control system for controlling posture and other features of a construction machine.

As a construction machine, a slip-form paving machine is known, which is used for continuously paving concrete slabs by slip-form technical method, for instance.

The slip-form technical method is a method for continuously constructing a structure having the same cross-section by mounting a steel mold on a molding machine, by charging the concrete into the mold, and by carrying out compaction molding, and at the same time, by moving the molding machine forward.

In a case where the slip-form paving machine continuously paves concrete slabs, high accuracy is required for surface finishing, and this finishing accuracy should generally be in the grade of accuracy of several millimeters.

A conventional type control system for the slip-form paving machine is disclosed in the U.S. Patent Application Publication US2006/0198700A1. In the control system for construction machine as disclosed in US2006/0198700A1, at least two reflectors and two tilt sensors are provided at predetermined positions on the slip-form paving machine, and at least two position measuring devices corresponding to each of the reflectors are installed at known positions. Based on the positions of at least two reflectors measured by the position measuring device, and also, based on tilting detected by the two tilt sensors, posture of the slip-form paving machine is detected, and the slip-form paving machine is controlled according to a result of this detection.

In the conventional type construction machine control system as described above, a plurality of position measuring devices are needed, and re-positioning of the position measuring device must be repeatedly performed each time the procedure for a predetermined range of construction is completed. Therefore, working procedure is complicated and requires much time. For the purpose of acquiring position and posture of the slip-form paving machine based on the results of a plurality of measurements obtained by a plurality of position measuring devices and also based on the results of detection by the tilt sensors, a plurality of communication system are required or the like and system configuration is complicated.

SUMMARY OF THE INVENTION

It is an object of the present invention to provide a construction machine control method and a construction machine control system, which are simple system configuration, and by which the installation operation is simple.

To attain the above object, a construction machine control method according to the present invention comprises a step of projecting N-shaped beams in rotary irradiation at constant speed by a laser surveying instrument, a step of detecting the N-shaped beams by at least three beam detectors installed at known positions of a construction machine operated within a photodetection range of the N-shaped beams, a step of obtaining elevation angle of each of the beam detectors with respect to the laser surveying instrument based on results of detection of the N-shaped beams by the at least three beam detectors and a step of controlling tilting of the construction machine based on the at least three elevation angles obtained.

Further, a construction machine control system according to the present invention comprises a laser surveying instrument for projecting N-shaped beams in rotary irradiation at constant speed, a construction machine operated within a predetermined range of the N-shaped beams, and an elevation angle detecting unit, and in the construction machine control system, the construction machine comprises a working mechanical unit for carrying out construction operation, a machine control device for controlling the working mechanical unit, and at least three beam detectors disposed at known positions respectively with respect to reference position of the construction machine, and the laser surveying instrument comprises an N-shaped beam projecting unit for projecting the N-shaped beams having three fan beams in rotary irradiation and a surveying control device, and the beam detectors detect the three fan beams and outputs result of photodetection, and the elevation angle detecting unit is provided on either one of the beam detectors, the machine control device or the laser surveying instrument, and obtains elevation angles of each of the beam detectors with respect to the laser surveying instrument based on result of photodetection of three fan beams from the beam detectors, and the machine control device is configured so as to control tilting of the working mechanical unit based on the elevation angle obtained.

Further, in the construction machine control system according to the present invention, the working mechanical unit is disposed at a known position with respect to the reference position and to the beam detector, and the machine control device is so arranged that posture of the working mechanical unit is controlled according to the elevation angle obtained from the elevation angle detecting unit and also according to positional relation to the beam detector.

Further, in the construction machine control system according to the present invention, there are provided four beam detectors, and the beam detectors are provided respectively at four vertexes of a rectangle in planar shape.

Further, in the construction machine control system according to the present invention, the construction machine further comprises a machine communication unit, the laser surveying instrument further comprises a surveying communication unit, and the machine communication unit transmits detection timing of the N-shaped beams by each of the beam detectors to the surveying communication unit, and the laser surveying instrument obtains horizontal angle of each of the beam detectors with respect to the laser surveying instrument based on detection timing of the N-shaped beams, and the machine control device measures tilting and tilting direction of the construction machine based on the horizontal angle and the elevation angle.

Further, in the construction machine control system according to the present invention, each of the beam detectors further comprises a communication unit for detector, the laser surveying instrument further comprises a surveying communication unit, and the communication unit for detector transmits detection timing of the N-shaped beams by each of the beam detectors to the surveying communication unit, and the laser surveying instrument obtains horizontal angle of each of the beam detectors with respect to the laser surveying instrument based on detection timing of the N-shaped beams, and the machine control device measures tilting and tilting direction of the construction machine based on the horizontal angle and the elevation angle.

Further, in the construction machine control system according to the present invention, the beam detectors obtain an error curve in advance over total circumference regarding elevation angle detectable by detecting the N-shaped beams and corrects the elevation angle detected based on the error curve acquired.

Further, in the construction machine control system according to the present invention, the N-shaped projection unit an N-shaped beam forming optical member, and the N-shaped beam forming optical member has a pentagonal prism, a laser beam splitting optical member disposed on the pentagonal prism and used for splitting a laser beam to three laser beams, and a cylindrical lens provided on exit surface of the laser beams as split and for diffusing the laser beams in up-to-down direction, and the cylindrical lenses are tilted with each other so that the laser beams projected from the cylindrical lens forms the N-shaped beams.

Further, in the construction machine control system according to the present invention, the laser beam splitting optical member splits the laser beams in horizontal direction.

Further, in the construction machine control system according to the present invention, the laser beam splitting optical member splits the laser beams in vertical direction.

According to the present invention, the construction machine control method comprises a step of projecting N-shaped beams in rotary irradiation at constant speed by a laser surveying instrument, a step of detecting the N-shaped beams by at least three beam detectors installed at known positions of a construction machine operated within a photo-detection range of the N-shaped beams, a step of obtaining elevation angle of each of the beam detectors with respect to the laser surveying instrument based on results of detection of the N-shaped beams by the at least three beam detectors and a step of controlling tilting of the construction machine based on the at least three elevation angles obtained. As a result, it is possible to detect the tilting of the construction machine by a laser rotary projection unit and at least three beam detectors, to extensively reduce the cost for equipment and facilities and to perform control in wide range in which the N-shaped beams can be detected, and re-installment operation is extensively reduced.

Further, according to the present invention, the construction machine control system comprises a laser surveying instrument for projecting N-shaped beams in rotary irradiation at constant speed, a construction machine operated within a predetermined range of the N-shaped beams, and an elevation angle detecting unit, and in the construction machine control system, the construction machine comprises a working mechanical unit for carrying out construction operation, a machine control device for controlling the working mechanical unit, and at least three beam detectors disposed at known positions respectively with respect to reference position of the construction machine, and the laser surveying instrument comprises an N-shaped beam projecting unit for projecting the N-shaped beams having three fan beams in rotary irradiation and a surveying control device, and the beam detectors detect the three fan beams and outputs result of photodetection, and the elevation angle detecting unit is provided on either one of the beam detectors, the machine control device or the laser surveying instrument, and obtains elevation angles of each of the beam detectors with respect to the laser surveying instrument based on result of photodetection of three fan beams from the beam detectors, and the machine control device is configured so as to control tilting of the working mechanical unit based on the elevation angle obtained. As a result, it is possible to control tilting of the component in advancing direction of the construction machine and tilting of the component in the direction, which perpendicularly crosses the advancing direction. Also, it is possible to extensively reduce the costs for equipment and facilities and to perform control in wide range in which the N-shaped beams can be detected, and re-installation operation is extensively reduced.

Further, according to the present invention, in the construction machine control system, the working mechanical unit is disposed at a known position with respect to the reference position and to the beam detector, and the machine control device is so arranged that posture of the working mechanical unit is controlled according to the elevation angle obtained from the elevation angle detecting unit and also according to positional relation to the beam detector. As a result, the operation of the laser surveying instrument is limited only to the rotary projection of the fan beams, and the laser surveying instrument can be accomplished in simple configuration.

Further, according to the present invention, in the construction machine control system, there are provided four beam detectors, and the beam detectors are provided respectively at four vertexes of a rectangle in planar shape. As a result, calculation for obtaining the horizontal angle becomes easier.

Further, according to the present invention, in the construction machine control system, the construction machine further comprises a machine communication unit, the laser surveying instrument further comprises a surveying communication unit, and the machine communication unit transmits detection timing of the N-shaped beams by each of the beam detectors to the surveying communication unit, and the laser surveying instrument obtains horizontal angle of each of the beam detectors with respect to the laser surveying instrument based on detection timing of the N-shaped beams, and the machine control device measures tilting and tilting direction of the construction machine based on the horizontal angle and the elevation angle. As a result, it is possible to detect the tilting of the component in advancing direction of the construction machine and the tilting of the component in a direction, which perpendicularly crosses the advancing direction.

Further, according to the present invention, in the construction machine control system, each of the beam detectors further comprises a communication unit for detector, the laser surveying instrument further comprises a surveying communication unit, and the communication unit for detector transmits detection timing of the N-shaped beams by each of the beam detectors to the surveying communication unit, and the laser surveying instrument obtains horizontal angle of each of the beam detectors with respect to the laser surveying instrument based on detection timing of the N-shaped beams, and the machine control device measures tilting and tilting direction of the construction machine based on the horizontal angle and the elevation angle. As a result, it is possible to detect the tilting of the component in advancing direction of the construction machine and the tilting of the component in a direction, which perpendicularly crosses the advancing direction.

Further, according to the present invention, in the construction machine control system, the beam detectors obtain an error curve in advance over total circumference regarding elevation angle detectable by detecting the N-shaped beams and corrects the elevation angle detected based on the error curve acquired. As a result, the accuracy to detect the elevation angle is improved.

Furthermore, according to the present invention, in the construction machine control system, the N-shaped projection unit an N-shaped beam forming optical member, and the N-shaped beam forming optical member has a pentagonal prism, a laser beam splitting optical member disposed on the pentagonal prism and used for splitting a laser beam to three laser beams, and a cylindrical lens provided on exit surface of the laser beams as split and for diffusing the laser beams in up-to-down direction, and the cylindrical lenses are tilted with each other so that the laser beams projected from the cylindrical lens forms the N-shaped beams. As a result, it is possible to obtain N-shaped beams by a simple optical member and by a simple configuration.

BRIEF DESCRIPTION OF THE DRAWINGS

FIG. 10 is an explanatory drawing to explain detection of the N-shaped beams and detection of a horizontal angle by fan beam detectors;

FIG. 11A shows a detecting position to detect the N-shaped beams and FIG. 11B shows an error curve of elevation angle measured over total circumference;

DETAILED DESCRIPTION OF THE PREFERRED EMBODIMENT

Description will be given below on an embodiment of the present invention by referring to the attached drawings.

First, referring to FIG. 1, description will be given on general features of a construction machine control system according to the embodiment of the present invention.

Figure 1:
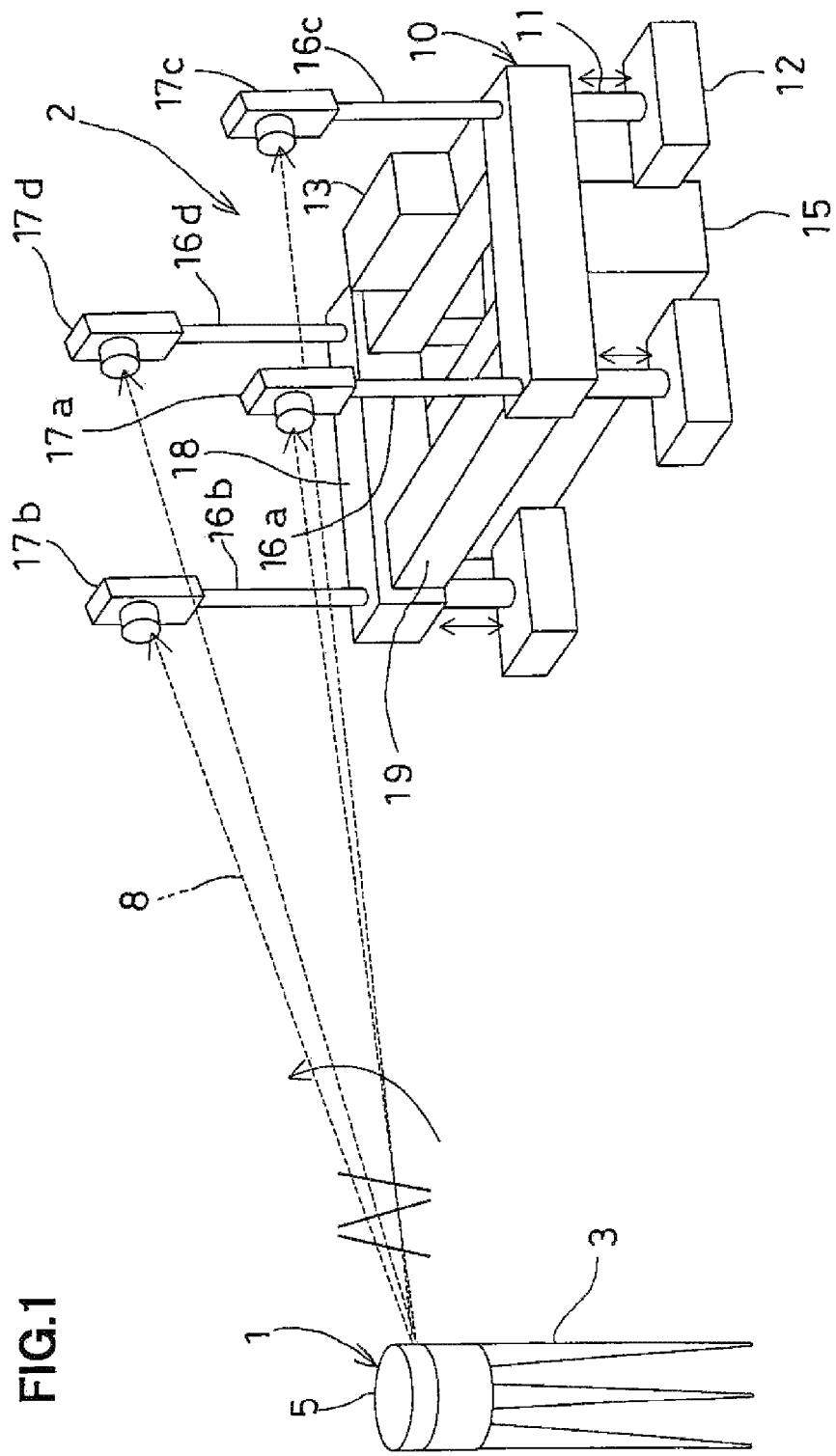
FIG. 1 is a schematical perspective view of a construction machine control system according to an embodiment of the present invention.

In FIG. 1, reference numeral 1 represents a laser surveying instrument, and reference numeral 2 represents a slip-form paving machine as an example of the construction machine.

The laser surveying instrument 1 is installed at a known point via a tripod 3. The laser surveying instrument 1 comprises a laser rotary projection unit 5 for projecting a laser beam in rotary irradiation, and a surveying communication unit 23 (to be describer later), which is used for performing wireless communication to and from a machine control device 13 (to be described later) installed on the slip-form paving machine 2. As to be described later, a position where the laser surveying instrument 1 is installed may not be a known point if only a tilting of the slip-form paving machine 2 is detected and controlled.

The laser rotary projection unit 5 projects N-shaped beams 8, which have a plurality of fan beams (three fan-beams are shown in the figure) and projects the N-shaped beams 8 in rotary irradiation at constant speed so that cross-section of luminous fluxes of the laser beam is formed in N-shape.

A range of construction operation is set up so that the slip-form paving machine 2 is operated within photodetection range of the N-shaped beams 8. The slip-form paving machine 2 comprises a machine body frame 10 designed in rectangular form, a running device 12 installed at each of four corners of the machine body frame 10 respectively, each being disposed via a leg unit 11 expansible and contractible in up-and-down direction, and a machine control device 13 installed on the machine body frame 10.

As each of the running devices 12, a crawler running device is used, for instance. Running operation of each of the running devices 12 can be individually controlled by the machine control device 13.

On a lower surface of the center of the machine body frame 10, two sets of screeds 15 are disposed (the two sets of the screeds 15 are shown as integrated with each other in the figure). The screeds 15 are disposed with a predetermined distance from each other (at a known distance) in front-to-back direction. Further, each of the screeds has a predetermined width (a known length). The screeds carries out a series of processes with high accuracy for storing the mixed and kneaded concrete slabs and further, for compacting and molding while placing the concrete slabs. Height of each of the screeds 15, i.e. height of concrete placing surface, is primarily controlled by properly controlling expansion and contraction of the leg units 11. The screeds 15 and the running devices 12 fulfill the functions of a working mechanical unit of the slip-form paving machine 2, and the working mechanical unit is controlled by the machine control device 13.

At the positions as required on the machine body frame 10—preferably at four corners of the machine body frame 10, or more preferably at four corners of a rectangle, pillars 16a, 16b, 16c and 16d are erected respectively, and on upper end of each of the pillars 16a, 16b, 16c and 16d, fan beam detectors 17a, 17b, 17c and 17d are installed respectively.

Each of the fan beam detectors 17a, 17b, 17c and 17d has a spot-like photodetection sensor (not shown) for detecting the N-shaped beams 8 respectively, and each has a communication unit 39 for detector (to be described later). The communication unit 39 for detector performs wireless communication and sends photodetection signals as emitted from the photodetection sensor to the laser surveying instrument 1 respectively and/or sends the photodetection signal to the machine control device 13.

Height of each of the fan beam detectors 17a, 17b, 17c and 17d (that is, position of the height of the photodetection sensor—i.e. position of photodetection) is to be at the same height when the slip-form paving machine 2 is at horizontal position, and position of height of each of the photodetection sensors and position within horizontal plane (i.e. three-dimensional position of each of the photodetection sensors) is a known value with respect to reference position of the slip-form paving machine 2 (e.g. installation center of each of the screeds 15).

Of the fan beam detectors 17a, 17b, 17c and 17d, a straight line for connecting two fan beam detectors 17a and 17b on front side (i.e. a straight line connecting the two photodetection sensors) and a straight line connecting two fan beam detectors 17c and 17d on rear side (i.e. a straight line connecting the two photodetection sensors) are set in such manner that these straight lines perpendicularly cross the advancing direction of the slip-form paving machine 2 respectively. Further, a distance between 17a, 17b, 17c and 17d from each other is determined in advance and is already known. Also, positional relation between the fan beam detectors 17a, 17b, 17c and 17d from each other and the two sets of screeds 15 (i.e. difference in elevation direction and horizontal distance) are already known.

The machine body frame 10 comprises two longitudinal beams 18 extended in parallel to the advancing direction and two lateral beams 19 perpendicularly crossing the longitudinal beams 18, and the lateral beams 19 are extended or contracted according to the condition of construction operation. Also, the distance between the fan beam detectors 17a, 17b, 17c and 17d from each other is already known under the condition of expansion and contraction.

The laser surveying instrument 1 has a surveying communication unit 23 (to be descried later), and result of photodetection is received from the fan beam detectors 17 via the surveying communication unit 23. Then, based on the results thus received, horizontal angle and elevation angle can be determined (by taking the laser surveying instrument 1 as reference) at the moment when the laser beam is received by the fan beam detectors 17a, 17b, 17c and 17d.

At the moment when each of the fan beams 17a, 17b, 17c and 17b detects the N-shaped beams 8 respectively, photodetection signals (detection timing signals) are transmitted to the laser surveying instrument 1 together with an identification signal (to be described later), and the laser surveying instrument 1 detects horizontal angle at the moment when the fan beam detectors 17a, 17b, 17c and 17d detect the N-shaped beams 8 based on the photodetection signals. As a result, horizontal angle of each of the fan beam detectors 17a, 17b, 17c and 17d can be measured.

Based on the results of the measurement of the elevation angle, tilting of the slip-form paving machine 2 can be measured, and the results of the measurement of the elevation angle and the horizontal angle are transmitted to the machine control device 13 by the surveying communication unit 23. The measurement of the elevation angle will be described later.

The laser surveying instrument 1 transmits the horizontal angle and the elevation angle thus measured to the machine control device 13 via a wireless communication unit. Based on the horizontal angle and the elevation angle thus received and also based on the identification signals (to be described later), the machine control device 13 calculates height of each of the fan beam detectors 17a, 17b, 17c and 17d, and also, calculates tilting and tilting direction of the slip-form paving machine 2. Then, the machine control device 13 controls the leg units 11, the running devices 12, the screeds 15, etc. based on the results of calculation at timing as required and to conditions as required.

Next, referring to FIG. 2, description will be given below on approximate configuration of the construction machine control system.

The laser surveying instrument 1 has a surveying arithmetic control unit 21, a surveying storage unit 22, and a surveying communication unit 23. The surveying arithmetic control unit 21 carries out coordinated control on the laser rotary projection unit 5. In the surveying storage unit 22, various types of programs are stored. These programs include: a program necessary for the coordinated control, a necessary program which makes the laser rotary projection unit 5 project the N-shaped beams 8 in rotary projection and measures the elevation angles and the horizontal angles based on the photodetection signals from the fan beam detectors 17a, 17b, 17c and 17d and other programs.

Further, the laser surveying instrument 1 comprises an N-shaped beam projecting unit 27 for projecting the N-shaped beams 8 and for projecting the beams in rotary irradiation, an elevation angle detecting unit 25 for detecting elevation angle of the fan beam detectors 17a, 17b, 17c and 17d based on the N-shaped beam photodetection signals transmitted from the fan beam detectors 17a, 17b, 17c and 17d, and a horizontal angle detecting unit 26 for detecting the horizontal angles based on the N-shaped beam photodetection signals.

The laser rotary projection unit 5 has a rotary driving unit 32 for projecting the N-shaped beams 8 in rotary irradiation. The driving of the rotary driving unit 32 is controlled by a driving control unit 33, and the surveying arithmetic control unit 21 issues a control command necessary for controlling the driving to the driving control unit 33.

The elevation angle detecting unit 25, the horizontal angle detecting unit 26, the N-shaped beam projecting unit 27, the rotary driving unit 32, the driving control unit 33, etc. make up together a principal portion of the laser rotary projection unit 5.

The slip-form paving machine 2 comprises a machine arithmetic control unit 35 which makes the screeds 15 carry out a series of processes as given above, a machine storage unit 36 where the programs necessary for executing a series of processes are stored, a machine communication unit 37 for performing communication of control information or the like to and from the surveying communication unit 23, and a driving control unit 38 for controlling the driving of the running devices 12 and the screeds 15. The machine control device 13 comprises the machine arithmetic control unit 35, the machine storage unit 36, the machine communication unit 37, the driving control unit 38, etc.

The slip-form paving machine 2 has the fan beam detectors 17a, 17b, 17c and 17d. Each of the fan beam detectors 17a, 17b, 17c and 17d has a communication unit 39 for detector respectively.

The photodetection signals detected by the fan beam detectors 17a, 17b, 17c and 17d are communicated by wireless to the laser surveying instrument 1 by the communication unit 39 for detector, and/or the signals are sent to the machine arithmetic control unit 35. To the wireless signals to be transmitted from the communication unit 39 for detector, identification signals, each matching the fan beam detectors 17a, 17b, 17c and 17d, may be added for differentiating purposes.

Figure 3:
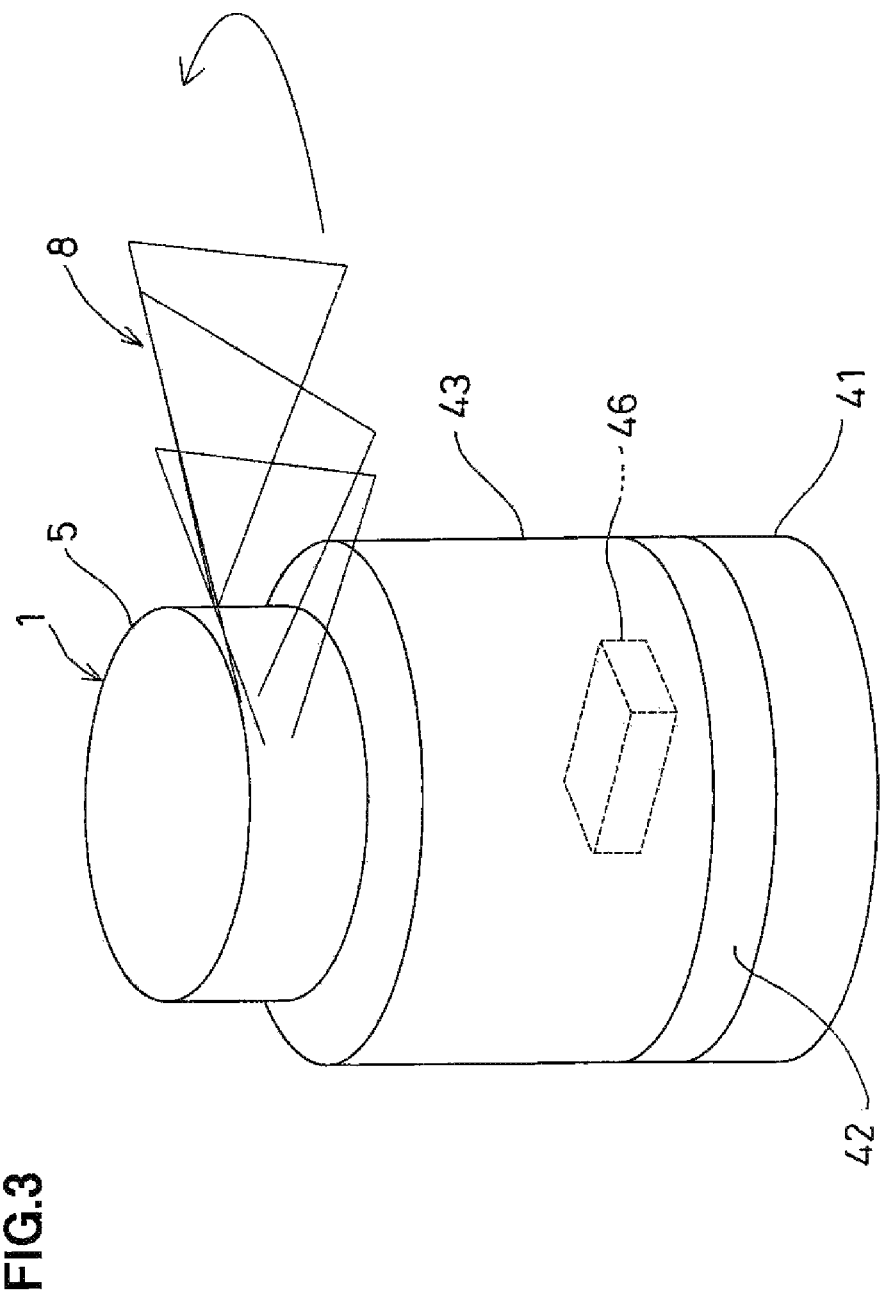
FIG. 3 is a schematical perspective view of a laser surveying instrument to be used in the construction machine control system.

Next, referring to FIG. 3 to FIG. 7, description will be given further on the laser surveying instrument 1. In FIG. 3, the tripod 3 is not shown for the purpose of facilitating the explanation.

The laser surveying instrument 1 has a leveling unit 41. A leveling base plate 42 is installed on the leveling unit 41, and a main unit 43 is disposed on the leveling base plate 42. The laser rotary projection unit 5 is installed on upper surface of the main unit 43. The leveling unit 41 carries out leveling operation on the main unit 43 via the leveling base plate 42.

In the main unit 43, the elevation angle detecting unit 25 for detecting elevation angle of the laser rotary projection unit 5, the horizontal angle detecting unit 26 for detecting horizontal angle of the laser rotary projection unit 5, a projecting optical system for projecting the N-shaped beams 8, and further, the rotary driving unit 32 for rotating the laser rotary projection unit 5 in horizontal direction, a surveying control device 46, etc. are stored. The elevation angle detecting unit 25 has CPU, programs, etc. for calculating elevation angle based on detection signals from the fan beam detectors 17. An encoder or the like installed on rotating portion of the laser rotary projection unit 5 is used as the horizontal angle detecting unit 26. The elevation angle detecting unit 25 may be installed on each of the fan beam detectors 17a, 17b, 17c and 17d, or may be disposed on the machine arithmetic control unit 35.

The surveying control device 46 comprises the surveying arithmetic control unit 21, the surveying storage unit 22, the surveying communication unit 23, the elevation angle detecting unit 25, the horizontal angle detecting unit 26, the driving control unit 33 or the like.

A tilt sensor (not shown) is disposed on the leveling unit 41 so that the leveling unit 41 can perform the leveling of the main unit 43 in horizontal direction based on the result of detection by the tilt sensor.

Figure 4:
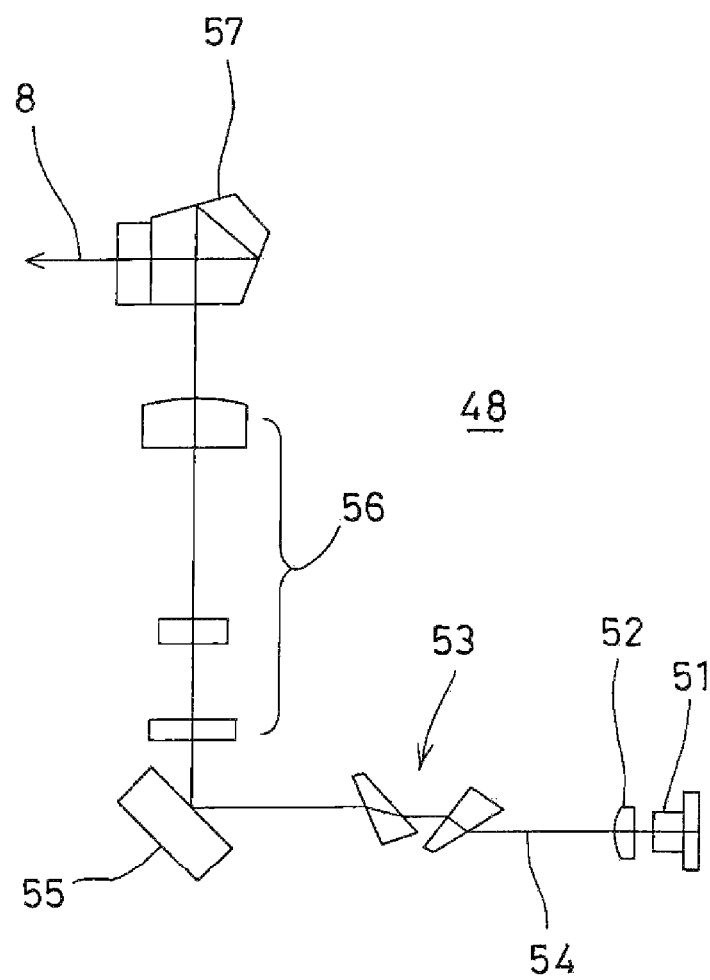
FIG. 4 is a schematical drawing of an optical system for projecting N-shaped beams in the laser surveying instrument.

FIG. 4 shows general features of an optical system 48 of the laser rotary projection unit 5.

In FIG. 4, reference numeral 51 represents a laser beam emitter such as a laser diode or the like, and a condenser lens 52 and a beam expander 53 are disposed along a light emitting optical axis of the laser beam emitter 51. A laser beam 54 as emitted from the laser beam emitter 51 are set to parallel luminous fluxes by the condenser lens 52, and cross-section of the luminous fluxes is adjusted to be in circular shape by the beam expander 53.

After passing through the beam expander 53, the laser beam 54 is deflected by a reflection mirror 55. A lens group 56 having relay lenses or the like are arranged along the deflected optical axis. After passing through the lens group 56, the laser beam 54 enters an N-shaped beam forming optical member 57.

The laser beam 54 thus entered is deflected by the N-shaped beam forming optical member 57 and are divided to three fan beams, and these three fan beams make up together the N-shaped beams 8. That is, when the laser beam 54 passes through the N-shaped beam forming optical member 57, the laser beam with circular cross-section is changed to the N-shaped beams 8.

The N-shaped beam forming optical member 57 is supported in such manner that the N-shaped beam forming optical member 57 can be rotated in horizontal direction with the vertical axis as a center. By the fact that the N-shaped beam forming optical member 57 is rotated by a rotating device (not shown in the figure), the N-shaped beams 8 are projected in rotary irradiation.

Figure 5:
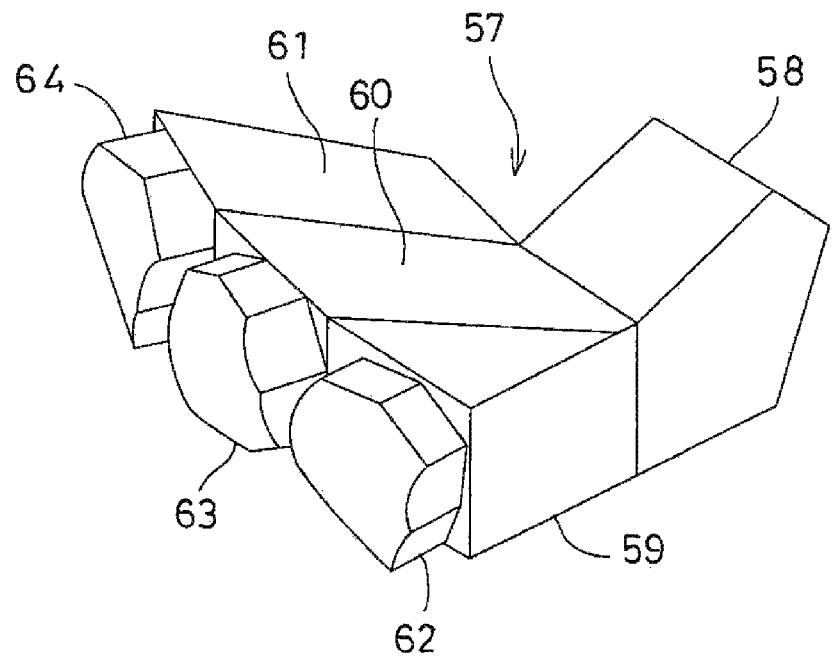
FIG. 5 is a schematical perspective view of an N-shaped beam forming optical member in the optical system.
Figure 6:
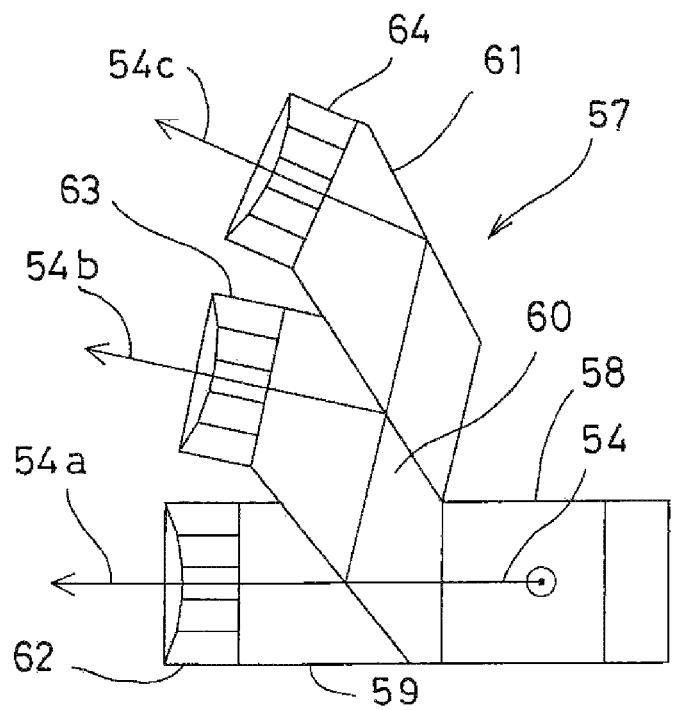
FIG. 6 is a plan view of the N-shaped beam forming optical member.
Figure 7:
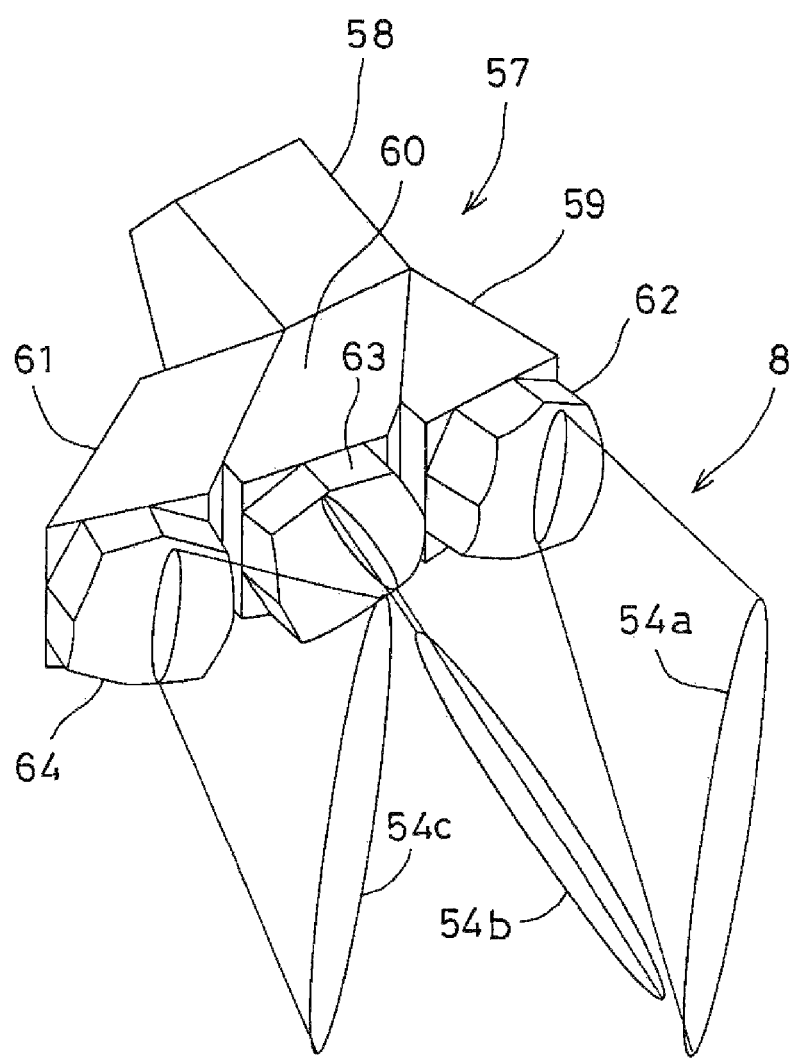
FIG. 7 is a schematical perspective view showing a relation between the N-shaped beam forming optical member and the N-shaped beams to be formed.

Now, referring to FIG. 5 to FIG. 7, description will be given below on the N-shaped beam forming optical member 57.

The N-shaped beam forming optical member 57 comprises a pentagonal prism 58, beam splitters 59, 60 and 61, serving as laser beam splitting optical members, and cylindrical lenses 62, 63 and 64 as disposed on exit surface of each of the beam splitters 59, 60 and 61 respectively. The cylindrical lenses 62, 63, and 64 are tilted so that center lines of cylindrical curved surfaces are tilted with each other. For instance, as shown in FIG. 7, center lines of the cylindrical lenses 62 and 64 on both sides run in vertical direction, while the center line of the cylindrical lens 63 at the center is tilted.

The laser beam 54, which enters the pentagonal prism 58 vertically from lower direction, is deflected in horizontal direction by the pentagonal prism 58. Then, the laser beam is split by the beam splitter 59 so that ⅓ of the laser beam is allowed to pass through while ⅔ of the laser beam is reflected. After passing through, the laser beam 54 is diffused in up-and-down direction by the cylindrical lens 62 and are projected as a fan beam 54a. The laser beam 54 reflected by the beam splitter 59 is split to two portions by the beam splitter 60. The laser beam 54 thus reflected is diffused in up-and-down direction by the cylindrical lens 63 and are projected as a fan beam 54b. Further, after passing through the beam splitter 60, the laser beam 54 is reflected by the beam splitter 61 and is diffused in up-and-down direction by the cylindrical lens 64 and is projected as a fan beam 54c.

As described above, the centerlines of cylindrical curved surfaces of the cylindrical lens 62, the cylindrical lens 63, and the cylindrical lens 64 are tilted with respect to each other. As a result, as shown in FIG. 7, the fan beams 54a, 54b and 54c projected from the cylindrical lenses 62, 63 and 64 make up the N-shaped beams 8.

The N-shaped beams 8 are projected in rotary irradiation at constant speed by the laser rotary projection unit 5 and are received by the fan beam detectors 17. Then, based on the result of photodetection by the fan beam detectors 17, elevation angle of the fan beam detectors 17 with respect to the laser rotary projection unit 5 can be obtained. Now, referring to FIG. 8 and FIG. 9, description will be given as to how the elevation angle is obtained.

The specification of the U.S. Pat. No. 7,110,102 discloses how to detect the N-shaped beams 8 and how to obtain the elevation angle.

Figure 8:
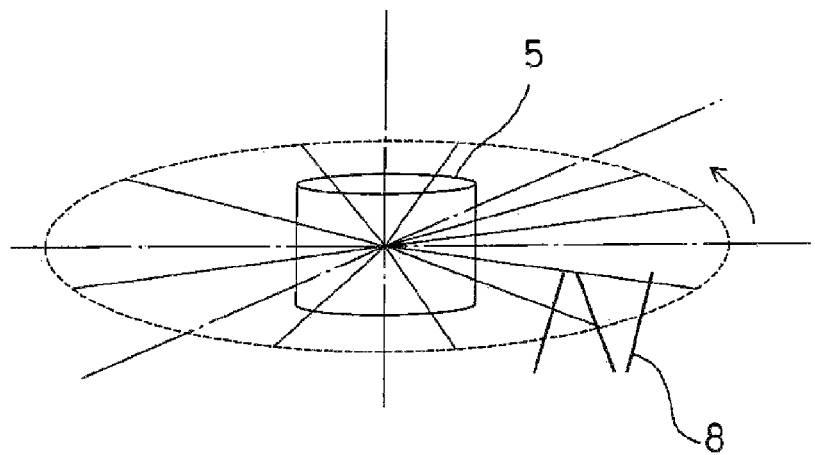
FIG. 8 is an explanatory drawing to show a condition where the N-shaped beams are projected in rotary irradiation by a laser surveying instrument.
Figure 9:
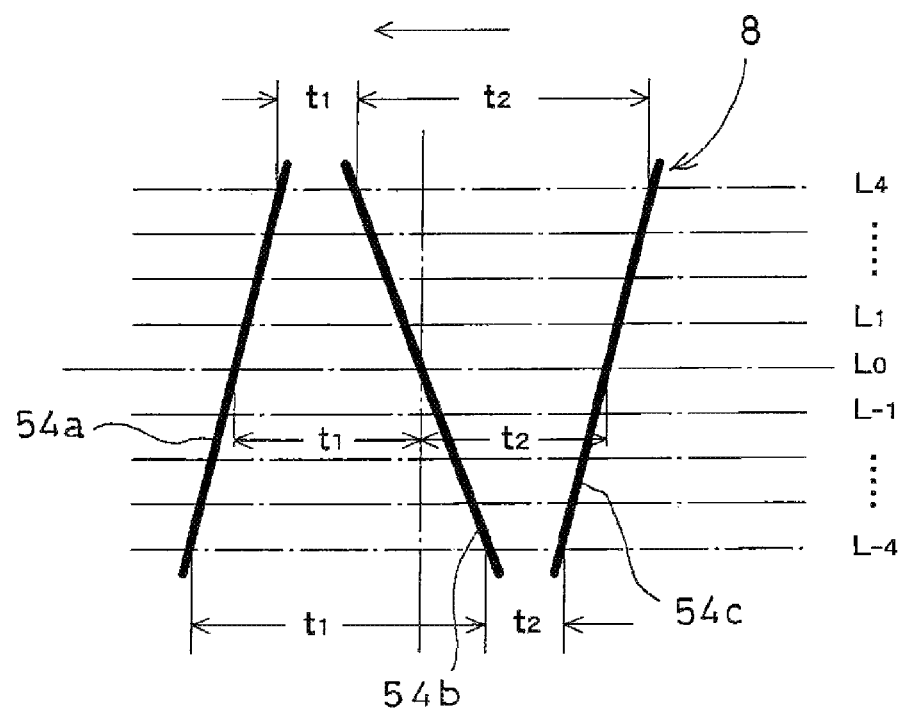
FIG. 9 is an explanatory drawing to show relation between the N-shaped beams and a detecting position when the N-shaped beams are projected in rotary irradiation.

FIG. 8 shows a condition where the N-shaped beams 8 are projected in rotary irradiation by the laser rotary projection unit 5, and rotating direction is shown by an arrow mark. FIG. 9 shows a relation between the N-shaped beams 8 and photodetecting positions in a case where the N-shaped beams 8 scan over the fan beam detectors 17. In FIG. 9, the arrow mark indicates rotating direction, and a plurality of horizontal lines show photodetecting positions of the fan beam detectors 17. The symbol L0 represents an elevation angle 0° (horizontal), and the symbols "L1 . . . L4" indicate that the elevation angle is in "+", and the symbols "L−1 . . . L−4" indicate that the elevation angle is in "−".

For instance, it is supposed that the fan beam detectors 17 detect the N-shaped beams 8 at a position of L0. When the fan beam detectors 17 detect the fan beams 54a, 54b and 54c respectively, photodetection signals are issued. Here, it is supposed that time difference of photodetection between the fan beams 54a and 54b is t1, and that time difference of photodetection between the fan beams 54b and 54c is t2. Then, at the position of L0, t1=t2 (t1/t2=1). At the position of L4, t1<t2 (t1/t2<1), and at the position of L−4, t1>t2 (t1/t2>1).

Tilting of each of the fan beams 54a, 54b and 54c is already known and is constant. Also, rotating speed is a constant speed (a known speed). Then, the elevation angle can be detected by obtaining the values of t1/t2 regardless of the distance between the laser surveying instrument 1 and the fan beam detectors 17.

Figure 2:
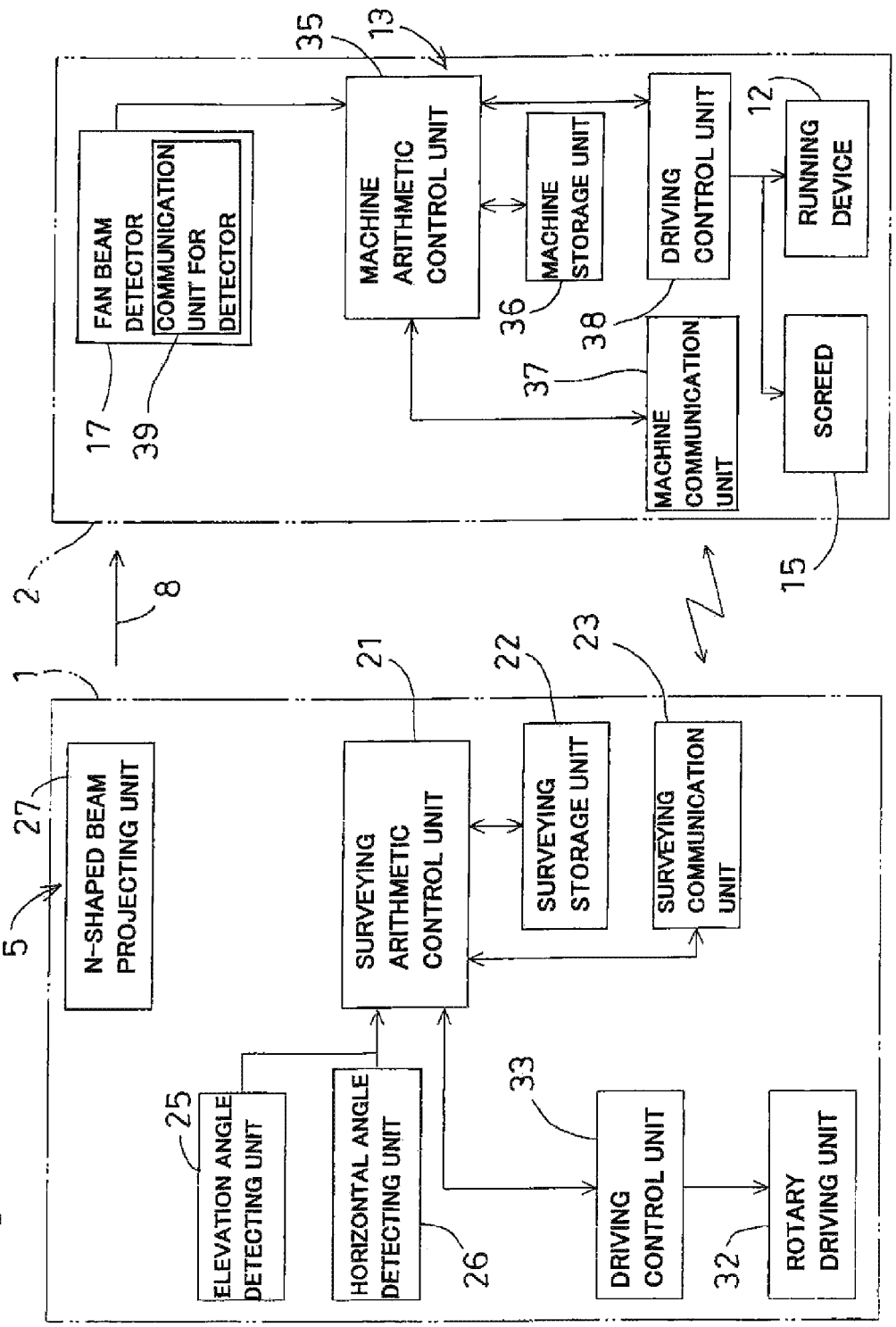
FIG. 2 is a schematical block diagram of the construction machine control system.

With regard to the detection of the elevation angle, in a case where the elevation angle detecting unit 25 is installed on the laser surveying instrument 1 as shown in FIG. 2, the fan beam detectors 17 transmit the results of detection to the laser surveying instrument 1 and the elevation angle may be calculated at the surveying arithmetic control unit 21. Or, in a case where the elevation angle detecting unit 25 is disposed on the machine control device 13, the fan beam detectors 17 transmit the result of detection to the machine control device 13 and the elevation angle may be calculated at the machine control device 13. Further, in a case where the elevation angle detecting unit 25 is provided on the fan beam detectors 17 themselves, it may be so arranged that the elevation angle is calculated based on the result of photodetection of the N-shaped beams 8, and the result of calculation may be transmitted to the machine control device 13.

By obtaining elevation angle of each of the fan beam detectors 17a, 17b, 17c and 17d and by controlling the leg units 11 by the machine control device 13 so that the values of the elevation angles will be the same, posture of the slip-form paving machine 2 can be controlled in horizontal direction.

Because distances between the fan beam detectors 17a, 17b, 17c and 17d from each other are all known values, amount of tilting and tilting direction can be obtained based on the difference of elevation angle of the fan beam detectors 17a, 17b, 17c and 17d from each other and also based on the distance between the fan beam detectors 17a, 17b, 17c and 17d from each other. Further, positional relation of the fan beam detectors 17a, 17b, 17c and 17d and the two sets of the screeds 15 are also already known. Thus, when the machine control device 13 acquires elevation angle from each of the fan beam detectors 17a, 17b, 17c and 17d, difference in the height of the two sets of screeds 15 (i.e. tilting in advancing direction) and elevation difference in width direction of the screeds 15 (i.e. tilting in a direction perpendicularly crossing the advancing direction) can be calculated. Further, based on this result of the calculation, the machine control device 13 can control the posture of the screeds 15 in horizontal direction.

Next, by referring to FIG. 10, description will be given on operation of elevation angle measurement in the embodiment.

To facilitate the explanation, it is supposed here that there are two fan beam detectors 17. Then, by referring to FIG. 10, description will be given on a case where two of the fan beam detectors 17a and 17b detect the N-shaped beams 8. The distance between the fan beam detectors 17a and 17b is supposed to be A meters (e.g. 10 meters).

In FIG. 10, a line R indicates a reference direction as set on the laser surveying instrument 1. The laser surveying instrument 1 can determine projecting direction of the N-shaped beams 8 by using the line R as reference.

By projecting the N-shaped beams 8 in rotary irradiation, the fan beam detectors 17a and 17b detect the N-shaped beams 8, and the result of the detection is transmitted from the fan beam detectors 17a and 17b to the laser surveying instrument 1. At the moment when the fan beam detectors 17a and 17b detect the N-shaped beams 8, the laser surveying instrument 1 detects the projecting directions of the N-shaped beams 8. As a result, horizontal angles α1 and α2 of the fan beam detectors 17a and 17b are detected respectively. It is assumed here that the photodetection signal for detecting the horizontal angle is issued when the fan beam received, for instance, when either one of the fan beams 54a or 54b or 54c is received.

Also, the fan beam detectors 17a and 17b can detect the N-shaped beams 8 (i.e. the fan beams 54a, 54b and 54c), and based on the result of photodetection, elevation angles of the fan beam detectors 17a and 17b can be detected. In the figure, a condition where the fan beam detector 17a is at a position lower than a horizontal reference plane formed by the N-shaped beams 8 (i.e. the elevation angle is in "−"), and the fan beam detector 17b is at a position higher than the horizontal reference plane (i.e. the elevation angle is in "+") is shown, and the figure indicates a condition where the fan beam detector 17a is at a position lower than the fan beam detector 17b.

Similarly, the horizontal angle and the elevation angle can be obtained in the same manner on the fan beam detectors 17c and 17d on rear side. By obtaining all of the horizontal angles and the elevation angles of the fan beam detectors 17a, 17b, 17c and 17d, and based on the elevation angles and on relative positional relations among the fan beam detectors 17a, 17b, 17c and 17d, direction and tilting (i.e. posture) of the slip-form paving machine 2 can be determined.

Figure 11A:
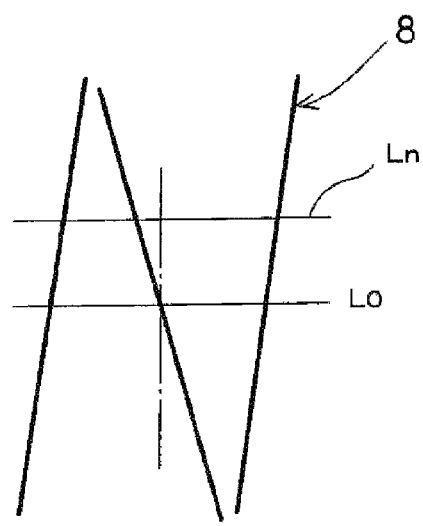
FIG. 11A and FIG. 11B are explanatory drawings to show a detecting position to detect the N-shaped beams of the fan beam detectors and an error about total circumference of elevation angle to be measured at a detecting position.

Now, referring to FIG. 11, description will be given on the correction of the elevation angle detected by the fan beam detectors 17.

In a case where the N-shaped beam projecting unit 27 (see FIG. 2) projects the N-shaped beams 8 in rotary irradiation, the N-shaped beams 8 are projected in rotary irradiation while changing the intensity or the form according to de-centering of the rotation axis of the N-shaped beam projecting unit 27 (deviation of optical axis), changes of beam profile (changes of cross-sectional form of the beam or unevenness of intensity or the like), and unsteadiness. The elevation angle by the fan beam detectors 17 is obtained, depending on position of the passing-through of the N-shaped beams 8. Accordingly, when the N-shaped beams 8 are projected in rotary irradiation while changing the intensity or changing the form, these phenomena cause an error in the elevation angle detected.

Figure 11B:
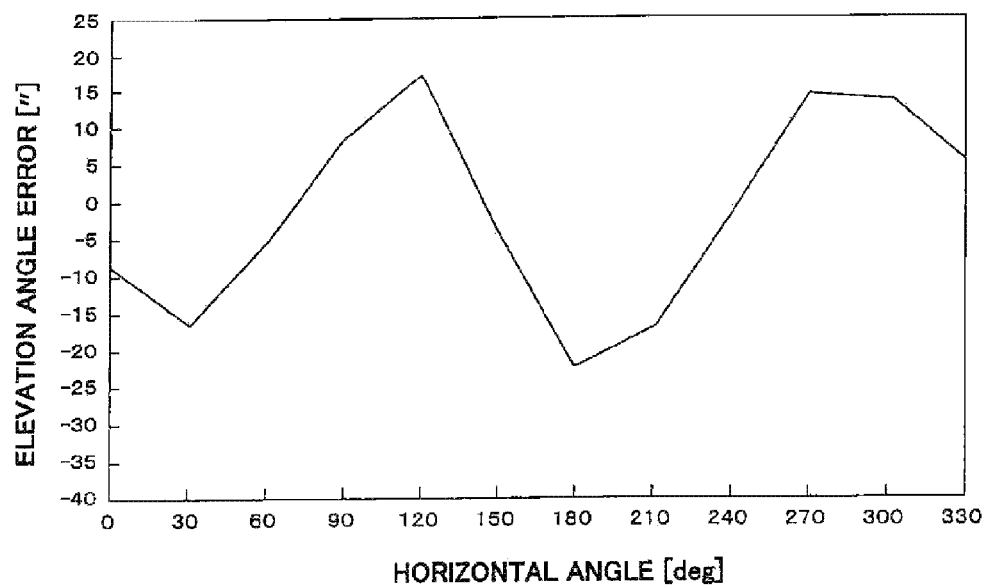

When the fan beam detectors 17 pass through "Ln" of the N-shaped beams 8, an error of the elevation angle to be detected is given as an error curve, which is shown in FIG. 11B as an example. As the measuring method, the fan beam detectors 17 are arranged with an angular pitch as required (e.g. with an angular pitch of 30°) on the circumference with the laser rotary projection unit 5 at the center. Then, the height of the photodetection sensor is set to the same value, and the elevation angle is calculated based on the result detected by the photodetection sensor.

Two sine curves are included in the figure, and it is evident that two or more causes of error are involved. Reproducibility of the error curve is high, and the same error may emerge in the same direction. Therefore, by acquiring the error curve in advance according to the horizontal angle, the detected elevation angle can be corrected based on the error curve, and it is possible by the correction to determine the elevation angle with higher accuracy.

In the figure, the error curve is obtained at one point (position "Ln" in the figure). However, luminous fluxes of the N-shaped beams 8 are divided to two or more fluxes in elevation direction. For instance, as shown in FIG. 9, the error curve is obtained over total circumference at each elevation position, and a matching error curve is selected to suit the elevation angle and the horizontal angle obtained (detected) and the elevation angle may be corrected based on the selected error curve.

Figure 12:
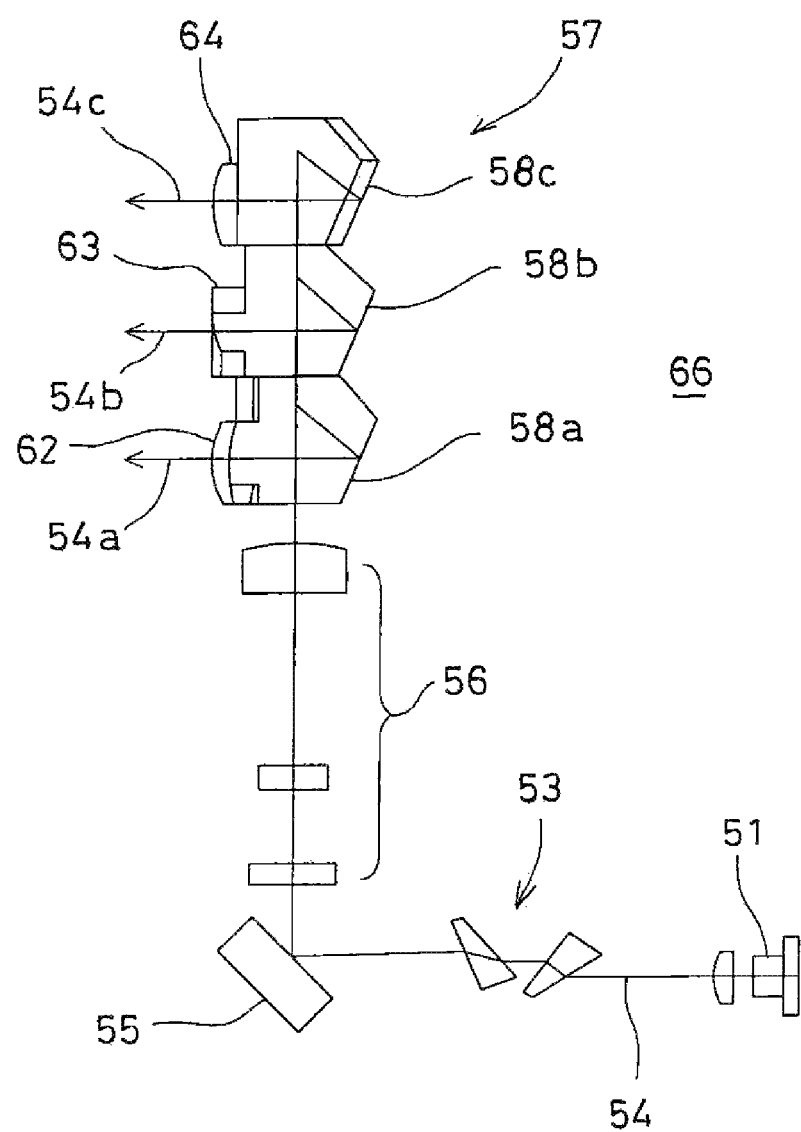
FIG. 12 is a schematical drawing of another optical system for projecting the N-shaped beams.
Figure 13:
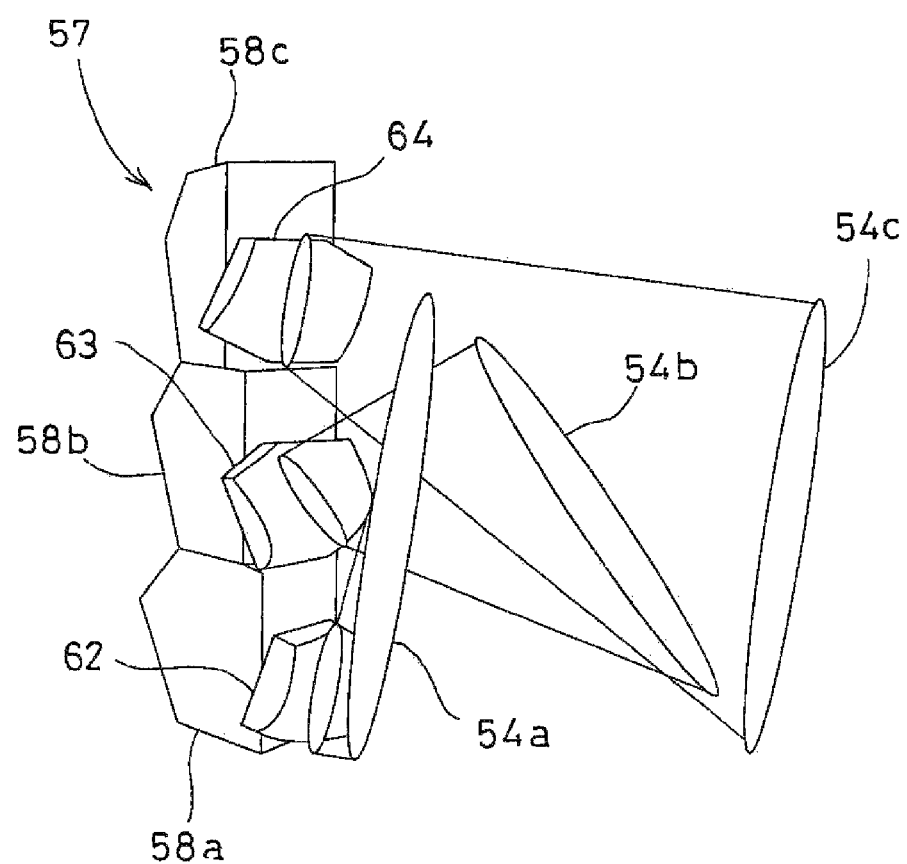
FIG. 13 is a schematical perspective view to show relation between the N-shaped beam forming optical member used for another optical system and N-shaped beams to be formed.

In FIG. 12 and FIG. 13, general features of another optical system 66 of the laser rotary projection unit 5 are shown. In FIG. 12, the same component as shown in FIG. 4 is referred by the same symbol, and detailed description is not given here.

In this another optical system 66, three pentagonal prisms 58a, 58b and 58c are arranged in contact with each other in vertical direction as the laser beam splitting optical members. The laser beam 54 is split by a first reflection surface of each of the pentagonal prisms 58a and 58b. Then, the cylindrical lenses 62, 63 and 64 are attached on exit surface of each of the pentagonal prisms 58a, 58b and 58c respectively, and the fan beams 54a, 54b and 54c are formed. The cylindrical lenses 62, 63 and 64 are disposed with tilting with respect to each other so that the N-shaped beams 8 are formed by the fan beams 54a, 54b and 54c respectively.

In the present embodiment as given above, description has been given on the slip-form paving machine 2, while it is needless to say that the present embodiment can be applied on posture control of other type of construction machine. In the above embodiment, the fan beam detectors 17 are arranged at four vertexes of a rectangle respectively, but positions is not necessarily limited to the four vertexes if the fan beam detectors 17 are arranged at known positions. In the above embodiment, the fan beam detectors 17 are installed—two at forward positions and two at rearward positions, while if the fan beam detectors 17 may be so arranged that two fan beam detectors 17 are disposed at forward positions and one detector at rearward position. Further, five or more fan beam detectors 17 may be disposed.

Further, to determine the position of the slip-form paving machine 2, a GPS device for measuring position coordinates of the slip-form paving machine 2 may be provided on the slip-form paving machine 2.

Next, description will be given on applied examples of the present embodiment.

A first applied example is a control in a case where a posture of the slip-form paving machine 2 is controlled horizontally and more convenient control can be performed. Namely, by projecting the N-shaped beams 8 in rotary irradiation at constant speed and detecting the N-shaped beams 8 by the fan beam detectors 17a, 17b, 17c and 17d, elevation angles of the fan beam detectors 17a, 17b, 17c and 17d are obtained. Therefore, it is sufficient to extend or contract the leg units 11 in such manner that the elevation angles as obtained are equivalent or a deviation of the elevation angles as obtained is 0. That is, it is possible to control the slip-form paving machine 2 horizontally only by results of detection of the fan beam detectors 17a, 17b, 17c and 17d.

It is possible to determine which of the leg units 11 to be extended or contracted according to the identification signals which the fan beam detectors 17a, 17b, 17c and 17d issue.

Also, a control for maintaining the slip-form paving machine 2 at a constant tilting can be performed only by the results of detection of the fan beam detectors 17a, 17b, 17c and 17d. That is, the results of detection of the fan beam detectors 17a, 17b, 17c and 17d are corresponded to the identification signals and a detected elevation angle of each of the fan beam detectors 17a, 17b, 17c and 17d is set so as to be a predetermined tilting. Then, it is sufficient to control extension or contraction of the leg units 11 in such manner that elevation angles which the fan beam detectors 17a, 17b, 17c and 17d detect are the elevation angle as set.

In a second applied example, by using the elevation angles detected by the fan beam detectors 17a, 17b, 17c and 17d and the relative positional relations of the fan beam detectors 17a, 17b, 17c and 17d, a tilting angle and the tilting direction can be set.

That is, by corresponding each result of detection of the fan beam detectors 17a, 17b, 17c and 17d to each identification signal of them, it is possible to detect each elevation angle of the fan beam detectors 17a, 17b, 17c and 17d. Further, it is possible to detect the tilting angle and the tilting direction with the slip-form paving machine 2 as reference, i.e., the tilting angle and the tilting direction of the slip-form paving machine 2 itself according to the relative positional relations of the fan beam detectors 17a, 17b, 17c and 17d.

The tilting direction can be detected from the elevation angle at each position of the fan beam detectors 17a, 17b, 17c and 17d. Further, the deviations of the elevation angles among the fan beam detectors 17a, 17b, 17c and 17d are determined. Further, distances among the fan beam detectors 17a, 17b, 17c and 17d can be acquired respectively from the relative positional relations, and the tilting angle can be measured from the difference of the distance and the elevation angle.

Further, in a case where the slip-form paving machine 2 paves a straight road, a running direction is decided in advance and a running posture is not changed, either. Accordingly, from each result of detection by the fan beam detectors 17a, 17b, 17c and 17d, from each identification signal of them and from the relative positional relations of the fan beam detectors 17a, 17b, 17c and 17d, the tilting and the tilting direction of the slip-form paving machine 2 can be controlled.

Next, description will be given on a third applied example.

In the third applied example, based on each elevation angle detected by the fan beam detectors 17a, 17b, 17c and 17d, based on each identification signal and based on each horizontal angle of the fan beam detectors 17a, 17b, 17c and 17d which the laser surveying instrument 1 detects, it is possible to maintain the slip-form paving machine 2 horizontally or in a predetermined tilting state and to control the advancing direction.

That is, by controlling the elevation angles which the fan beam detectors 17a, 17b, 17c and 17d detect at a same value, or by making the deviation of the elevation angles 0, it is possible to maintain the posture of the slip-form paving machine 2 horizontally.

Further, by comparing the identification signals and the detection signals of the fan beam detectors 17a, 17b, 17c and 17d, it is possible to maintain the slip-form paving machine 2 at a predetermined tilting angle. For instance, in a case where the slip-form paving machine 2 is set at the predetermined tilting angle and a predetermined tilting direction (at a predetermined posture) and the operation is started, it is possible to maintain the posture of the slip-form paving machine 2 itself as set.

Furthermore, based on the identification signals of the fan beam detectors 17a, 17b, 17c and 17d and on the horizontal angles, it is possible to detect the posture of the slip-form paving machine 2 with respect to the advancing direction. Also, it is possible to control the advancing direction of the slip-form paving machine 2 under construction.

The invention claimed is:

1. A construction machine control method, comprising:
projecting N-shaped beams in rotary irradiation at constant speed by a laser surveying instrument,
detecting said N-shaped beams by at least three beam detectors installed at known positions of a construction machine operated within a photodetection range of said N-shaped beams,
obtaining elevation angle of each of said beam detectors with respect to said laser surveying instrument based on results of detection of said N-shaped beams by said at least three beam detectors and
controlling tilting of said construction machine based on said at least three elevation angles obtained.

2. A construction machine control system, comprising
a laser surveying instrument for projecting N-shaped beams in rotary irradiation at constant speed,
a construction machine operated within a predetermined range of said N-shaped beams, and
an elevation angle detecting unit,
wherein said construction machine comprises a working mechanical unit for carrying out construction operation, a machine control device for controlling said working mechanical unit, and at least three beam detectors disposed at known positions respectively with respect to reference position of said construction machine,
wherein said laser surveying instrument comprises an N-shaped beam projecting unit for projecting said N-shaped beams having three fan beams in rotary irradiation and a surveying control device,
wherein said beam detectors detect said three fan beams and outputs result of photodetection,
wherein said elevation angle detecting unit is provided on either one of said beam detectors, said machine control device or said laser surveying instrument, and obtains elevation angles of each of said beam detectors with respect to said laser surveying instrument based on result of photodetection of three fan beams from said beam detectors, and wherein said machine control device is configured so as to control tilting of said working mechanical unit based on the elevation angle obtained.

3. A construction machine control system according to claim 2, wherein said working mechanical unit is disposed at a known position with respect to said reference position and to said beam detector, and said machine control device is so arranged that posture of said working mechanical unit is controlled according to the elevation angle obtained from said elevation angle detecting unit and also according to positional relation to said beam detector.

4. A construction machine control system according to claim 2, wherein there are provided four beam detectors, and said beam detectors are provided respectively at four vertexes of a rectangle in planar shape.

5. A construction machine control system according to claim 2, wherein said construction machine further comprises a machine communication unit, said laser surveying instrument further comprises a surveying communication unit, and said machine communication unit transmits detection timing of said N-shaped beams by each of said beam detectors to said surveying communication unit, wherein and said laser surveying instrument obtains horizontal angle of each of the beam detectors with respect to said laser surveying instrument based on detection timing of said N-shaped beams, and said machine control device measures tilting and tilting direction of said construction machine based on said horizontal angle and said elevation angle.

6. A construction machine control system according to claim 2, wherein each of said beam detectors further comprises a communication unit for detector, said laser surveying instrument further comprises a surveying communication unit, and said communication unit for detector transmits detection timing of said N-shaped beams by each of said beam detectors to said surveying communication unit, and said laser surveying instrument obtains horizontal angle of each of said beam detectors with respect to said laser surveying instrument based on detection timing of said N-shaped beams, and said machine control device measures tilting and tilting direction of said construction machine based on said horizontal angle and said elevation angle.

7. A construction machine control system according to claim 2, wherein said beam detectors obtain an error curve in advance over total circumference regarding elevation angle detectable by detecting said N-shaped beams and corrects the elevation angle detected based on the error curve acquired.

8. A construction machine control system according to claim 2, wherein said N-shaped projection unit an N-shaped beam forming optical member, and said N-shaped beam forming optical member has a pentagonal prism, a laser beam splitting optical member disposed on said pentagonal prism and used for splitting a laser beam to three laser beams, and a cylindrical lens provided on exit surface of said laser beams as split and for diffusing said laser beams in up-to-down direction, and said cylindrical lenses are tilted with each other so that said laser beams projected from said cylindrical lens forms said N-shaped beams.

9. A construction machine control system according to claim 8, wherein said laser beam splitting optical member splits said laser beams in horizontal direction.

10. A construction machine control system according to claim 8, wherein said laser beam splitting optical member splits said laser beams in vertical direction.

* * * * *